United States Patent
Lee et al.

(10) Patent No.: US 11,915,874 B2
(45) Date of Patent: Feb. 27, 2024

(54) MULTILAYER CAPACITOR

(71) Applicant: SAMSUNG ELECTRO-MECHANICS CO., LTD., Suwon-si (KR)

(72) Inventors: Sang Moon Lee, Suwon-si (KR); Taek Jung Lee, Suwon-si (KR); Sung Ho Lee, Suwon-si (KR); Seol Gyeong Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 44 days.

(21) Appl. No.: 17/723,933

(22) Filed: Apr. 19, 2022

(65) Prior Publication Data

US 2023/0148360 A1    May 11, 2023

(30) Foreign Application Priority Data

Nov. 10, 2021  (KR) .......................... 10-2021-0153890

(51) Int. Cl.
*H01G 4/232* (2006.01)
*H01G 4/30* (2006.01)

(52) U.S. Cl.
CPC .............. *H01G 4/2325* (2013.01); *H01G 4/30* (2013.01)

(58) Field of Classification Search
CPC ........ H01G 4/30; H01G 4/012; H01G 4/1227; H01G 4/2325; H01G 4/1209; H01G 4/228; H01G 4/306; H01G 2/02; H01G 4/008; H01G 4/32
See application file for complete search history.

(56) References Cited

U.S. PATENT DOCUMENTS

| | | | |
|---|---|---|---|
| 2009/0190285 A1* | 7/2009 | Kusano | H01G 4/30 361/321.4 |
| 2009/0323253 A1* | 12/2009 | Kobayashi | H01G 4/005 427/79 |
| 2011/0122540 A1* | 5/2011 | Ogawa | H01G 4/30 361/305 |
| 2011/0290542 A1 | 12/2011 | Nishisaka et al. | |
| 2012/0218677 A1* | 8/2012 | Fujisawa | H01G 4/008 156/89.16 |
| 2015/0213953 A1* | 7/2015 | Jun | H01G 4/30 252/512 |
| 2019/0180938 A1* | 6/2019 | Tahara | H01G 4/248 |
| 2021/0012964 A1* | 1/2021 | Lee | H01G 4/248 |
| 2022/0013291 A1* | 1/2022 | Nishisaka | H01G 4/1227 |

FOREIGN PATENT DOCUMENTS

| | | |
|---|---|---|
| JP | 2012-9813 A | 1/2012 |
| JP | 2019-117901 A | 7/2019 |
| KR | 10-2017-0096462 A | 8/2017 |

* cited by examiner

*Primary Examiner* — Michael P McFadden
(74) *Attorney, Agent, or Firm* — Morgan, Lewis & Bockius LLP

(57) ABSTRACT

A multilayer capacitor includes a body including a dielectric layer and a plurality of internal electrodes stacked on each other with the dielectric layer interposed therebetween; and external electrodes disposed externally on the body, and respectively including a first layer connected to the internal electrode and a second layer covering the first layer, wherein the first layer includes a metal particle including an element A, an oxide of an element Z, formed on the metal particle, and an A-Z intermetallic compound phase, and here, the element Z has a higher ionization tendency than the element A.

19 Claims, 12 Drawing Sheets

MULTILAYER CAPACITOR

CROSS-REFERENCE TO RELATED APPLICATION(S)

This application claims benefit of priority to Korean Patent Application No. 10-2021-0153890 filed on Nov. 10, 2021 in the Korean Intellectual Property Office, the disclosure of which is incorporated herein by reference in its entirety.

TECHNICAL FIELD

The present disclosure relates to a multilayer capacitor.

BACKGROUND

A capacitor is a device which may store electricity, and uses a principle that the electricity is accumulated in each of two electrodes of the capacitor generally when a voltage is applied to the capacitor in a state where the two electrodes are disposed opposite to each other. In a case where a direct current (DC) voltage is applied to the capacitor, a current flows in the capacitor while the electricity is accumulated in the capacitor. However, the current does not flow in the capacitor when the accumulation of the electricity is completed. Meanwhile, in a case where an alternating current (AC) voltage is applied to the capacitor, an AC current flows in the capacitor while polarities of the electrodes are alternated with each other.

The capacitor may be classified into several types based on a type of an insulator positioned between the electrodes such as an aluminum electrolytic capacitor in which the electrodes are made of aluminum and a thin oxide film is disposed between these aluminum electrodes, a tantalum capacitor in which tantalum is used as an electrode material, a ceramic capacitor in which a dielectric material of a high dielectric constant such as a barium titanate is positioned between the electrodes, a multilayer ceramic capacitor (MLCC) in which ceramic of a high dielectric constant, formed in a multilayer structure, is used as a dielectric material positioned between the electrodes, a film capacitor in which a polystyrene film is used as a dielectric material positioned between the electrodes, etc.

Among these capacitors, the multilayer ceramic capacitor has excellent temperature and frequency characteristics and may be implemented in a small size, and has thus been recently used widely in various fields such as a high frequency circuit. In recent years, there have been continuous efforts to make the multilayer ceramic capacitor smaller, and the dielectric layer, the internal electrodes and external electrodes are thinned to this end.

In accordance with an increasing demand in recent years for reducing a thickness of an electronic component, researches have been continuously conducted to reduce the thickness of the multilayer ceramic capacitor. However, when having a smaller thickness, the multilayer ceramic capacitor may have difficulty in sufficiently securing its electrical characteristics. In addition, when thinned, the external electrode may have reduced mechanical strength or electrical characteristics.

SUMMARY

An aspect of the present disclosure may provide a multilayer capacitor including an external electrode having improved electrical characteristics. Another aspect of the present disclosure may provide a multilayer capacitor including an external electrode having improved structural stability.

According to an aspect of the present disclosure, a multilayer capacitor may include a body including a dielectric layer and a plurality of internal electrodes stacked on each other with the dielectric layer interposed therebetween; and external electrodes disposed externally on the body, and respectively including a first layer connected to the internal electrode and a second layer covering the first layer, wherein the first layer includes a metal particle including an element A, an oxide of an element Z, disposed on the metal particle, and an A-Z intermetallic compound phase, where, the element Z has a higher ionization tendency than the element A.

The oxide of the element Z may exist on a surface of the metal particle.

The A-Z intermetallic compound phase may exist in the metal particle.

The first layer may further include an oxide of the element A.

The oxide of the element A may exist on a surface of the metal particle.

Some of the metal particles may not include the oxide of the element A.

The element A may be at least one element selected from the group consisting of nickel (Ni), silver (Ag), palladium (Pd), and gold (Au).

The second layer may be a copper (Cu) plating layer.

The element Z may be at least one element selected from the group consisting of manganese (Mn), chromium (Cr), silicon (Si), antimony (Sb), iron (Fe), niobium (Nb), aluminum (Al), boron (B), and zirconium (Zr).

The second layer may include a diffusion region of the element A.

The diffusion region may exist at a grain boundary of a metal component included in the second layer.

The second layer may include a diffusion region of the element Z.

The second layer may include a diffusion region of the element A and element Z.

The multilayer capacitor may further include a dummy electrode disposed in the body, and disposed at at least one of uppermost and lowermost portions of the plurality of internal electrodes.

A length of one side may have a value between −10% and +10% of (250+n*350) μm based on a direction in which the plurality of internal electrodes are stacked on each other, where "n" may be a natural number.

The multilayer capacitor may have a thickness of 70 μm or less when the thickness is defined based on its length measured in a direction in which the plurality of internal electrodes are stacked on each other.

The element A may include nickel (Ni).
The element Z may include aluminum (Al).

BRIEF DESCRIPTION OF DRAWINGS

The above and other aspects, features and advantages of the present disclosure will be more clearly understood from the following detailed description taken in conjunction with the accompanying drawings, in which.

Figure 1:
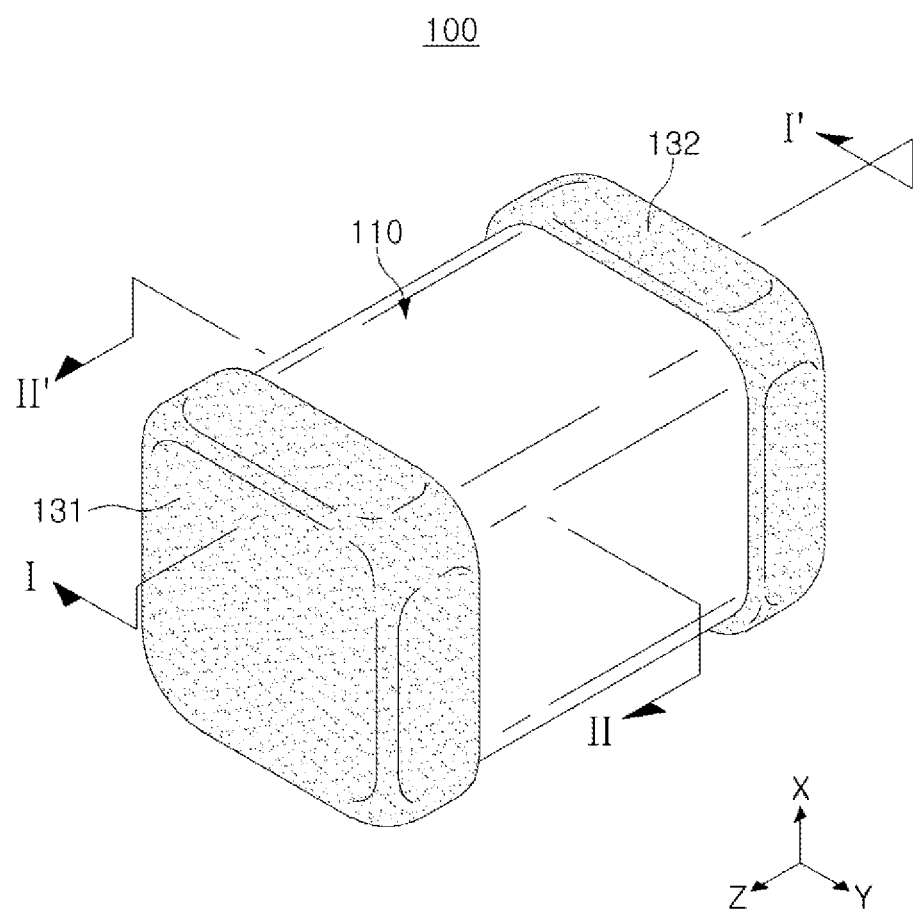
FIG. 1 is a perspective view schematically showing an appearance of a multilayer capacitor according to an exemplary embodiment of the present disclosure.
Figure 2:
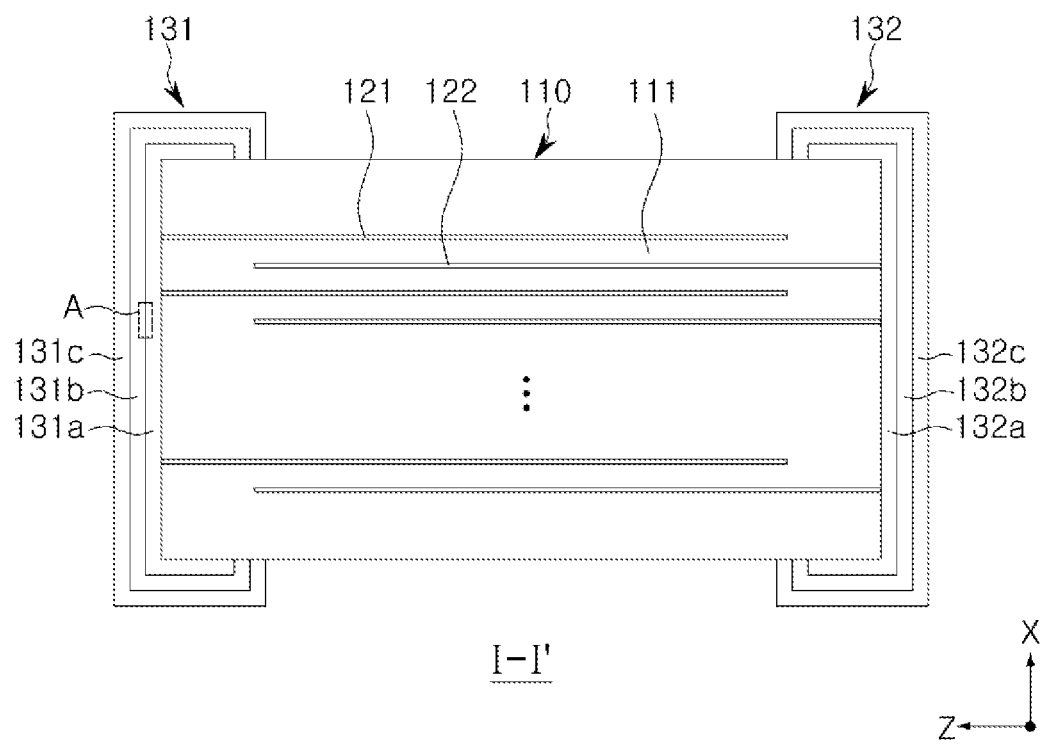
Figure 3:
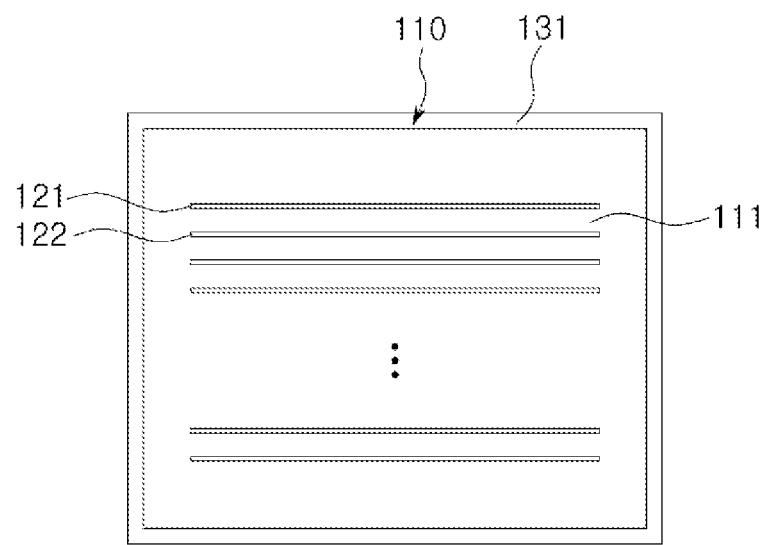
Figure 3:
Figure 4:
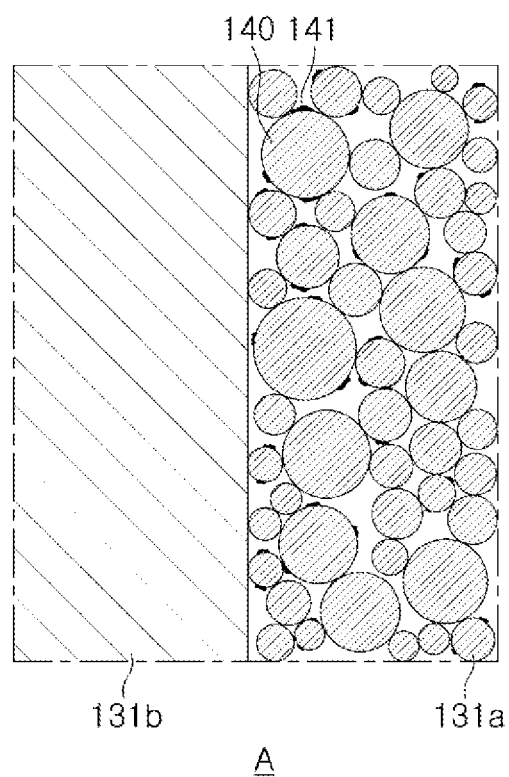
Figure 5:
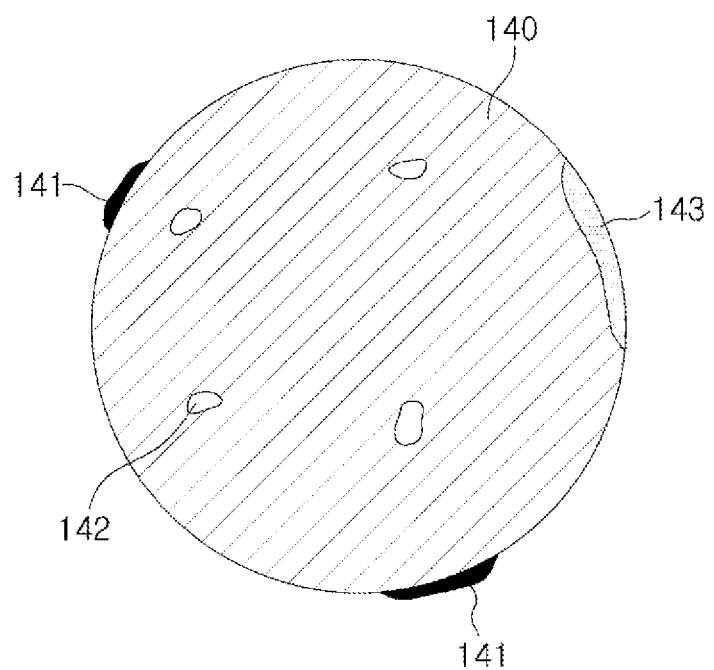
Figure 6:
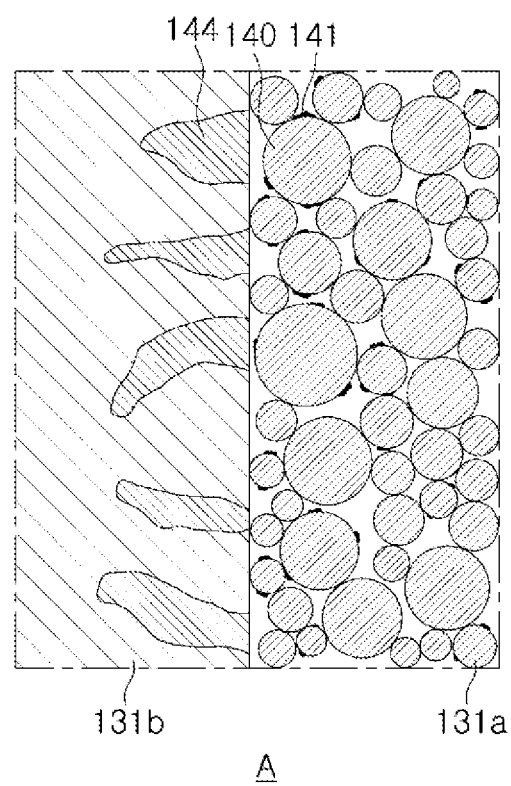

Each of FIGS. 2 and 3 is a cross-sectional view of the multilayer capacitor of FIG. 1;

FIGS. 4 and 6 are enlarged views of a partial region of an external electrode;

FIG. 5 is an enlarged view of a metal particle of the external electrode; and FIGS. 7 through 12 show multilayer capacitors according to modified examples of the present disclosure.

DETAILED DESCRIPTION

Hereinafter, exemplary embodiments of the present disclosure will now be described in detail with reference to the accompanying drawings.

FIG. 1 is a perspective view schematically showing an appearance of a multilayer capacitor according to an exemplary embodiment of the present disclosure; Each of FIGS. 2 and 3 is a cross-sectional view of the multilayer capacitor of FIG. 1; FIGS. 4 and 6 are enlarged views of a partial region of an external electrode; and FIG. 5 is an enlarged view of a metal particle of the external electrode.

Referring to FIGS. 1 through 3, a multilayer capacitor 100 according to an exemplary embodiment of the present disclosure may include a body 110 including a dielectric layer 111 and a plurality of internal electrodes 121 and 122 stacked on each other interposing the dielectric layer 111 therebetween, and external electrodes 131 and 132. Here, the external electrodes 131 and 132 may include first layers 131*a* and 132*a* and second layers 131*b* and 132*b*, respectively, and may additionally include third layers 131*c* and 132*c*, respectively. As shown in FIGS. 4 and 5, the first layers 131*a* and 132*a* may each include a metal particle 140, an oxide 141 of an element Z, formed on the metal particle 140, and an A-Z intermetallic compound phase 142. Here, "A" is a metal element included in the metal particle, and the element Z may have a higher ionization tendency than the element A.

The body 110 may have a structure in which the plurality of dielectric layers 111 are stacked on each other in a first direction (i.e. X-direction), and may be obtained by stacking a plurality of green sheets on each other and then sintering the same for example. The plurality of dielectric layers 111 may have an integrated shape by this sintering process, and may include a plurality of grains. In addition, as shown in FIG. 1, the body 110 may have a shape similar to a rectangular parallelepiped. The dielectric layer 111 included in the body 110 may include a ceramic material having a high dielectric constant, BT-based ceramics, i.e. barium titanate (BaTiO3) based ceramics, for example, and may also include any other material known in the art as long as the capacitor obtains sufficient capacitance. The dielectric layer 111 may further contain an additive, an organic solvent, a plasticizer, a binder, a dispersant and the like, if necessary, in addition to the ceramic material which is a main component. Here, when using the additive, the dielectric layer may include the additive in the form of a metal oxide during its manufacturing process. The metal oxide additive may include, for example, at least one of manganese dioxide ($MnO_2$), dysprosium oxide ($Dy_2O_3$), barium oxide (BaO), magnesium oxide (MgO), aluminium oxide ($Al_2O_3$), silicon dioxide ($SiO_2$), chromium(III) oxide ($Cr_2O_3$) and calcium carbonate ($CaCO_3$).

The plurality of internal electrodes 121 and 122 may be obtained by printing a paste, which includes a conductive metal (e.g., nickel (Ni), silver (Ag), copper (Cu), titanium (Ti), palladium (Pd) or the like) having a predetermined thickness, on one surface of a ceramic green sheet and then firing the same. In this case, the plurality of internal electrodes 121 and 122 may respectively be first and second internal electrodes 121 and 122 exposed from the body 110 in directions opposite to each other. The first and second internal electrodes 121 and 122 may respectively be connected to different external electrodes 131 and 132, may have different polarities while being driven, and may be electrically isolated from each other by the dielectric layer 111 disposed therebetween. However, the number of the external electrodes 131 and 132 or a method in which the external electrodes 131 and 132 and the internal electrodes 121 and 122 are respectively connected to each other may depend on exemplary embodiments.

The external electrodes 131 and 132 may be disposed externally on the body 110 and connected to the internal electrodes 121 and 122. In detail, the external electrodes 131 and 132 may be first and second external electrodes 131 and 132 respectively disposed on opposite surfaces of the body 110. The external electrodes 131 and 132 may respectively include the first layers 131*a* and 132*a* and the second layers 131*b* and 132*b*, and here the second layers 131*b* and 132*b* may be plating layers. In more detail, the second layers 131*b* and 132*b* may be copper (Cu) plating layers. In addition, the third layers 131*c* and 132*c* may also be plating layers, and for example, tin (Sn) plating layers each having a thickness of 4.5 μm or more.

In this exemplary embodiment, the first layers 131*a* and 132*a* respectively included in the external electrodes 131 and 132 may each be a structure designed to have structural stability and high electrical conductivity. As described above, the first layers 131*a* and 132*a* may each include the metal particle 140 including the element A, the oxide 141 of the element Z, formed on the metal particle 140, and the A-Z intermetallic compound phase 142. Here, the element A may use an element having excellent electrical conductivity and suitable for being diffused into the second layers 131*b* and 132*b*, and may be, for example, at least one element selected from the group consisting of Ni, Ag, Pd and gold (Au). In this case, the first layers 131*a* and 132*a* may be fired electrode layers obtained by firing the conductive paste, and may further include a glass component in addition to a metal component. Therefore, unlike shown in FIG. 4, boundaries between the metal particles 140 after the firing process may not be distinguished from each other. Hereinafter, the element A is described based on Ni as its representative example, and may use another element other than Ni. When the metal particle 140 includes Ni, the Ni component may be diffused into the second layers 131*b* and 132*b*, thereby improving adhesion between the first layers 131*a* and 132*a* and the second layers 131*b* and 132*b*, which may improve the structural stability of the external electrodes 131 and 132.

This adhesion improvement effect may be reduced when the metal particle 140 is oxidized to make a Ni oxide occur, which is because the diffusion of the Ni component is reduced due to the Ni oxide. In addition, the electrical conductivity of each of the first layers 131*a* and 132*a* may be reduced as the more Ni oxides occur. In this exemplary embodiment, the element Z having the relatively high ionization tendency (or oxidation tendency) may be added to minimize the occurrence of the Ni oxide. Here, the element Z may be at least one element selected from the group consisting of manganese (Mn), chromium (Cr), silicon (Si), antimony (Sb), iron (Fe), niobium (Nb), aluminum (Al), boron (B) and zirconium (Zr). Hereinafter, the description describes a case in which the element Z is aluminum (Al) as an example. However, the present disclosure may use another metal element described above other than Al.

The Al component may be added to the Ni particle to form the first layers 131a and 132a, wherein the Al component may have be a particle. However, the Al component may be coated on a surface of the Ni particle. During the firing process, the Al component may form an Al oxide (e.g., $Al_2O_3$). In this process, the oxidation of Ni, which has a lower ionization tendency than Al, may be suppressed. That is, nickel oxide (NiO) may be reduced by reacting with Al. In this process, Al may be oxidized conversely, and the formation of NiO may thus be suppressed. As shown in FIG. 5, the Al oxide, i.e. the oxide 141 of the element Z may exist on a surface of the metal particle 140. Oxidation of Ni may be suppressed by the oxide 141 of the element Z, and the electrical conductivity of the Ni particles 140 may thus be improved. In addition, an $Al_2O_3$ film formed on the surface of the Ni particle 140 may prevent the oxidation of Ni by itself in addition to the effect of preventing the oxidation of Ni by the ionization tendency of Al. When the occurrence of NiO is reduced in this way, the electrical conductivity of each of the first layers 131a and 132a may be improved, and an amount of the Ni component, diffused into the second layers 131b and 132b may be increased. Accordingly, the adhesion of the first layers 131a and 132a and the second layers 131b and 132b may also be strengthened, respectively. Meanwhile, the existence of the oxide 141 of the element Z and oxidation degree of the element Z may be checked by Raman analysis.

The metal particle 140 may include the A-Z intermetallic compound phase 142, and in this case, the A-Z intermetallic compound phase 142 may exist in the metal particle 140. The intermetallic compound phase may be observed by, for example, scanning electron microscopy (SEM), transmission electron microscopy (TEM), energy-dispersive X-ray spectroscopy (EDS). When including the A-Z intermetallic compound phase 142, the metal particle 140 may be more easily diffused into the second layers 131b and 132b, and the adhesion of the first layers 131a and 132a and the second layers 131b and 132b may thus be further strengthened, respectively. For example, when the Al component is added to the Ni particle 140, the Ni—Al intermetallic compound may include $NiAl_3$, $Ni_2Al_3$, NiAl, $Ni_5Al_3$, $Ni_3Al$, etc. FIG. 5 shows one metal particle 140. Here, the A-Z intermetallic compound phase 142 may exist in the metal particle 140, and the oxide 141 of the element Z may exist on the surface of the metal particle 140. Furthermore, an oxide 143 of the element A, i.e. Ni oxide, may be formed on the surface of the metal particle 140. However, as described above, in this exemplary embodiment, the occurrence of the Ni oxide 143 may be minimized, and some of the metal particles 140 may not include the Ni oxide 143. For example, 0.001% to 90% of the metal particles may not include the oxide 143 of the element A. The existence of the oxide 143 of the element A and the oxidation degree of the element A may be checked by Raman analysis.

FIG. 6 shows an example in which a diffusion region 144 is formed when some components are diffused from the first layers 131a and 132a to the second layers 131b and 132b, respectively. As described above, the second layers 131b and 132b may be copper (Cu) plating layers, and may each include the diffusion region 144 of the element A, for example, the Ni component. Accordingly, the diffusion region 144 may include an intermetallic compound of Cu—Ni. In addition, the diffusion region 144 may include the element Z, for example, the Al component, and may thus include an intermetallic compound of Cu—Al. Furthermore, the diffusion region 144 may be formed by diffusion of both the element A and the element Z, and may thus include an intermetallic compound of Cu—Ni—Al. When such diffusion is generated, the diffusion region 144 of each of the second layers 131b and 132b may exist at a grain boundary of a metal component, e.g. Cu, included in the second layers 131b and 132b. The diffusion region may be observed by, for example, scanning electron microscopy (SEM), transmission electron microscopy (TEM), energy-dispersive X-ray spectroscopy (EDS), electron probe microanalyzer (EPMA), and secondary-ion mass spectrometry (SIMS). The grain boundary may be observed by, for example, optical microscopy, electron microscopy, and field-ion microscopy.

Figure 7:
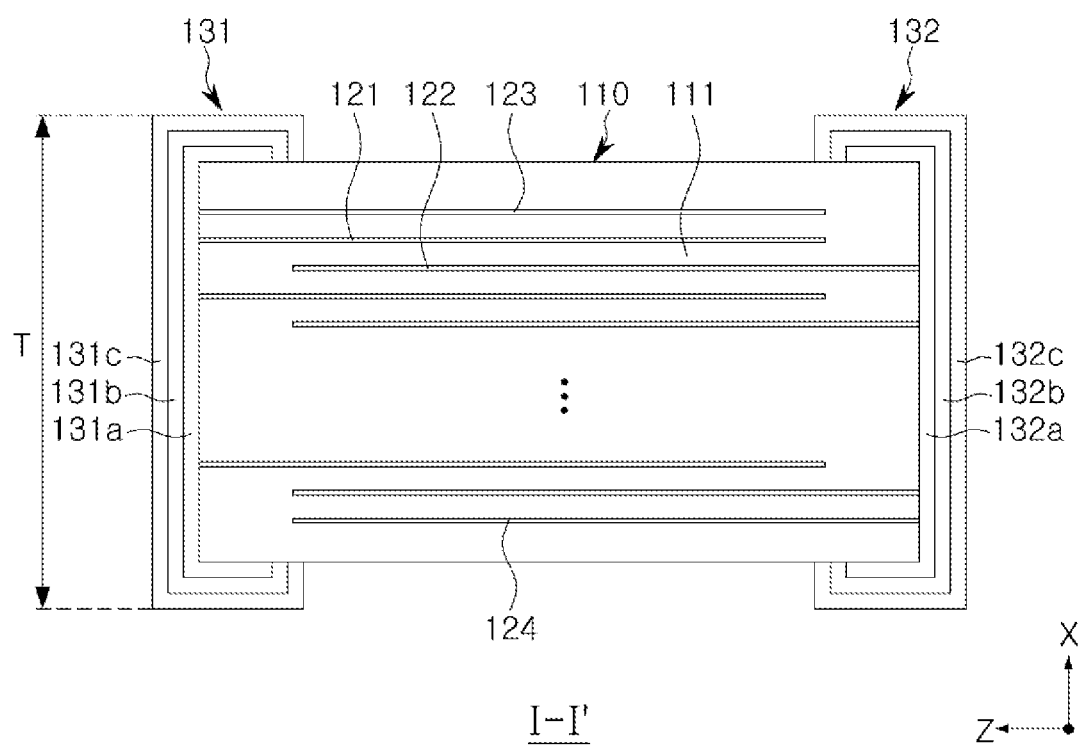

Hereinafter, multilayer capacitors according to modified examples are described with reference to FIGS. 7 through 12. The multilayer capacitor having the external electrode described above may have excellent structural stability and electrical characteristics, may thus be suitable to be used in a miniaturized component, and may have a remarkable effect when specifically used in a multilayer capacitor having a small thickness. FIG. 7 shows an exemplary embodiment in which dummy electrodes 123 and 124 are further disposed in addition to the internal electrodes 121 and 122, in which the multilayer capacitor may secure sufficient rigidity even when having the small thickness. Here, the multilayer capacitor may have a thickness T of about 70 μm or less when the thickness is defined based on its length measured in a direction (i.e. X direction) in which the plurality of internal electrodes 121 and 122 are stacked on each other. This thickness condition may be applied to both the previous and subsequent exemplary embodiments. The dummy electrodes 123 and 124 may respectively be formed in the same shape as the adjacent internal electrodes 121 and 122, and may respectively be connected to the external electrodes 131 and 132 respectively having the same polarities as the dummy electrodes 123 and 124. However, the dummy electrodes 123 and 124 may have different shapes from the adjacent internal electrodes 121 and 122, and may be connected to none of the external electrodes 131 and 132. FIG. 7 shows a modified example in which one dummy electrode 123 or 124 is disposed in each of upper and lower portions of the body 110. However, the plurality of dummy electrodes may be disposed in each of the upper and lower portions of the body 110. In addition, the dummy electrodes 123 and 124 may be applied to the following examples.

Figure 8:
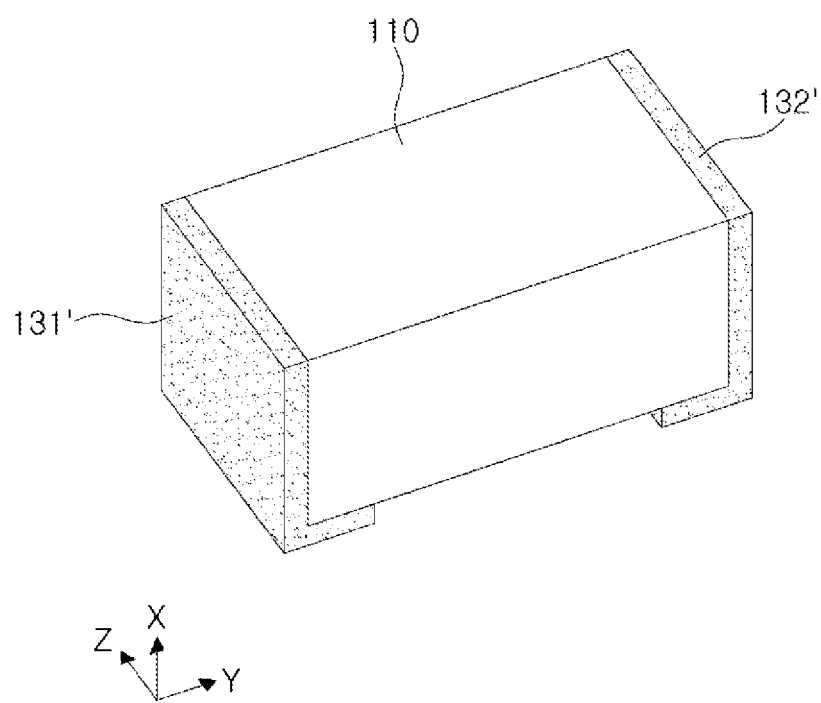
Figure 9:
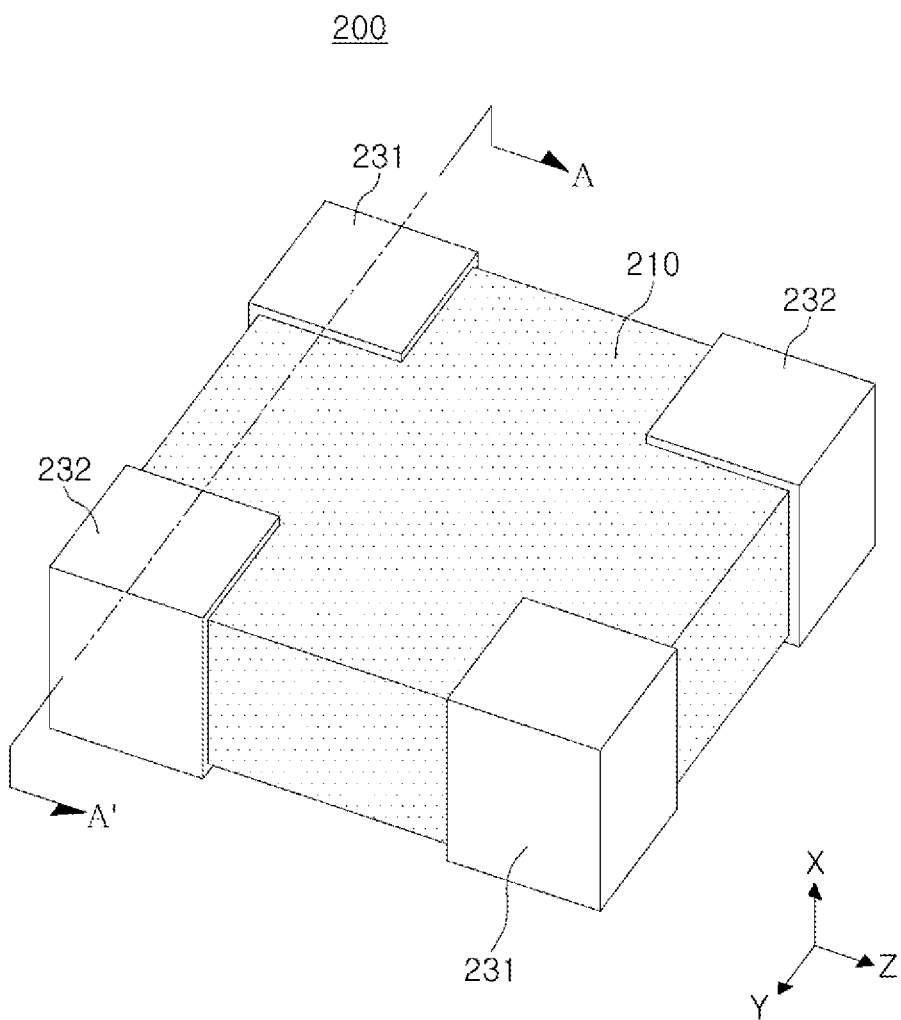
Figure 10:
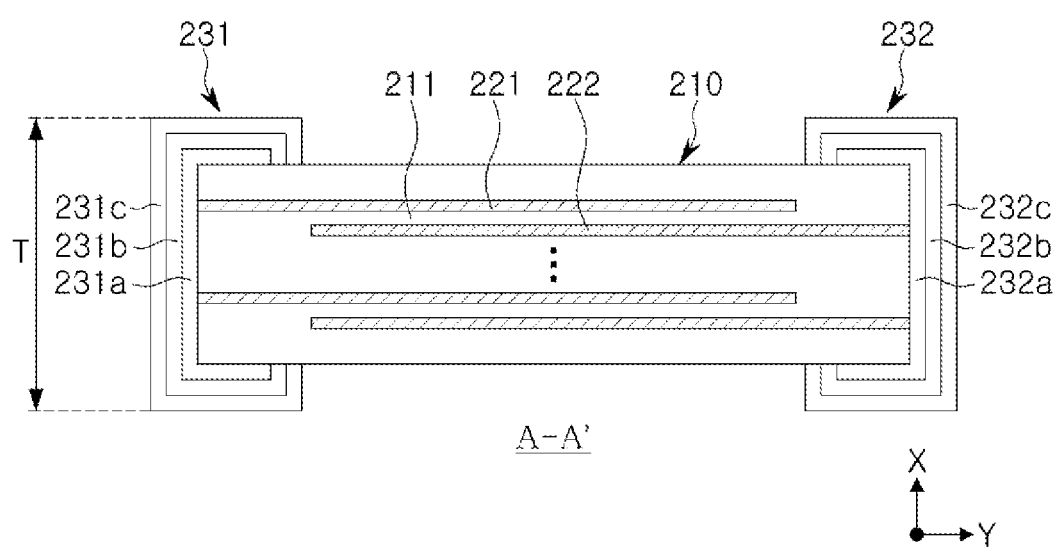

Next, FIG. 8 shows another modified example in which the external electrode has a different shape from that of the previous example. In this modified example, external electrodes 131' and 132' may each have a so-called bottom electrode structure, and may cover the side and lower surfaces of the body 110. In this case, the external electrodes 131' and 132' may include the same multi-layer structures as the above-described external electrodes 131 and 132, i.e. first layers 131a and 132a and second layers 131b and 132b, respectively. An overall size (or length in the X direction) of each of the external electrodes 131' and 132' may be reduced by using the bottom electrode structure, which may be advantageous for making the multilayer capacitor thinner. In addition, this bottom electrode structure may be applied to the following examples.

Next, FIGS. 9 through 12 show yet another modified example in which a multilayer capacitor 200 has a four-terminal square structure, which may be suitable for the multilayer capacitor to maintain high rigidity even when having the small thickness. A body 210 may include a dielectric layer 211 and a plurality of internal electrodes 221 and 222, and may have the square structure based on the direction (i.e. X direction) in which the plurality of internal electrodes 221 and 222 are stacked on each other. Accordingly, the multilayer capacitor 200 may also have an overall shape similar to the square. For example, the multilayer capacitor 200 may have a size in which a length of a side A1 or A2 is (250+n*350) μm based on the X direction, where "n" may be a natural number. For example, when "n" is 1, the multilayer capacitor 200 has a size of 600 μm*600 μm. However, when considering an error range, the length of the one side A1 or A2 may have a value between −10% and +10% of (250+n*350) μm. Here, the length of the one side may be a multiple of 350 μm in consideration of a pitch value of a solder ball and the like when the multilayer capacitor 200 is mounted on a board. In addition, a thickness T of the multilayer capacitor 200 may be as small as 70 μm or less, based on its length measured in the X direction. Meanwhile, the thickness T and length of the one side A1 or A2 of the multilayer capacitor 200 may indicate a maximum value among values measured in a plurality of regions, or may be a value obtained by averaging the plurality of values. The thickness T and length of the one side A1 or A2 may be measured by, for example, an optical microscope or a scanning electron microscope (SEM).

In this modified example, external electrodes 231 and 232 may include the same multi-layer structures as the above-described external electrodes 131 and 132, i.e. first layers 231a and 232a and second layers 231b and 232b, and may further include third layers 231c and 232c, respectively.

Figure 11:
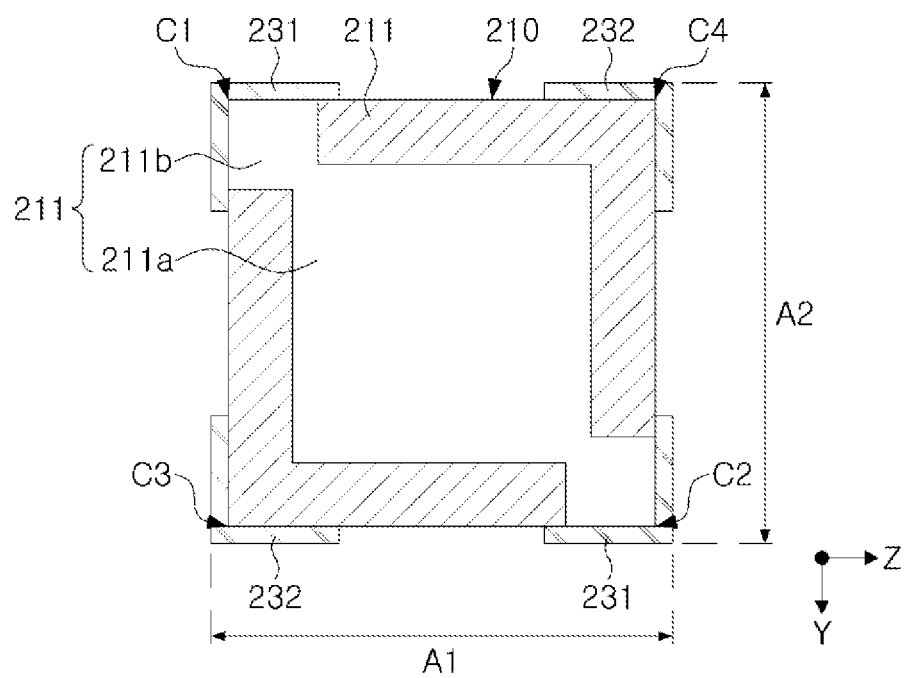
Figure 12:
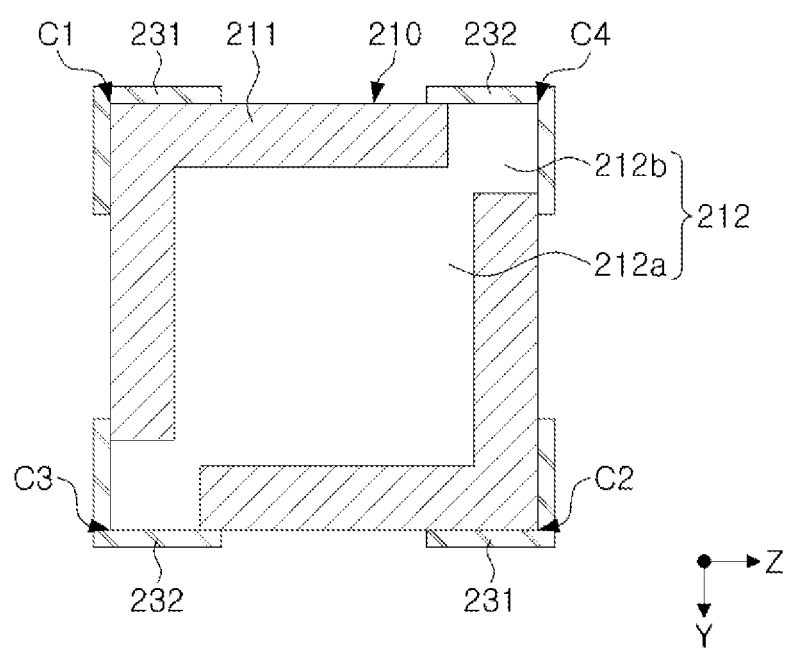

Referring to FIGS. 11 and 12, the first internal electrode 221 may be connected to the pair of first external electrodes 231, and may include a first main portion 211a and a first lead portion 211b. The first lead portion 211b may be connected to the first external electrode 231 by being extended in a diagonal direction in which each of first and second corners C1 and C2 of the body 210 and the first main portion 211a are connected to each other. The second internal electrode 212 may be connected to the pair of second external electrodes 232, and may include a second main portion 212a and a second lead portion 212b. The second lead portion 212b may be connected to the second external electrode 232 by being extended in a diagonal direction in which each of third and fourth corners C3 and C4 of the body 210 and the second main portion 212a are connected to each other.

The pair of first external electrodes 231 may respectively be disposed on the first and second corners C1 and C2 of the body 210, which are not adjacent to each other, and may be connected to the first internal electrode 211. Similarly, the pair of second external electrodes 232 may respectively be disposed on the third and fourth corners C3 and C4 of the body 210, which are not adjacent to each other, and may be connected to the second internal electrode 222. As shown in the drawings, the first and second external electrodes 231 and 232 may respectively be disposed on the opposite surfaces of the body 210 in the direction (i.e. X direction) in which the first and second internal electrodes 221 and 222 are stacked on each other, and may be extended to partially cover a side surface of the body 210.

As set forth above, the external electrode included in the multilayer capacitor according to an exemplary embodiment of the present disclosure may have at least one improved characteristics of the structural stability and the electrical characteristics.

While the exemplary embodiments have been shown and described above, it will be apparent to those skilled in the art that modifications and variations could be made without departing from the scope of the present disclosure as defined by the appended claims.

What is claimed is:

1. A multilayer capacitor comprising:
a body including
a dielectric layer and
a plurality of internal electrodes stacked on each other with the dielectric layer interposed therebetween; and
external electrodes disposed externally on the body, and respectively including
a first layer connected to the internal electrode and
a second layer covering the first layer,
wherein the first layer includes
a metal particle including an element A,
an oxide of an element Z, disposed on the metal particle, and
an A-Z intermetallic compound phase, where, the element Z has a higher ionization tendency than the element A and
wherein at least a portion of the A-Z intermetallic compound phase exists in the metal particle.

2. The multilayer capacitor of claim 1, wherein the oxide of the element Z exists on a surface of the metal particle.

3. The multilayer capacitor of claim 1, wherein the first layer further includes an oxide of the element A.

4. The multilayer capacitor of claim 3, wherein the oxide of the element A exists on a surface of the metal particle.

5. The multilayer capacitor of claim 4, wherein some of the metal particles do not include the oxide of the element A.

6. The multilayer capacitor of claim 1, wherein the element A is at least one element selected from the group consisting of nickel (Ni), silver (Ag), palladium (Pd), and gold (Au).

7. The multilayer capacitor of claim 6, wherein the element A includes nickel (Ni).

8. The multilayer capacitor of claim 1, wherein the second layer is a copper (Cu) plating layer.

9. The multilayer capacitor of claim 1, wherein the element Z is at least one element selected from the group consisting of manganese (Mn), chromium (Cr), silicon (Si), antimony (Sb), iron (Fe), niobium (Nb), aluminum (Al), boron (B), and zirconium (Zr).

10. The multilayer capacitor of claim 9, wherein the element Z includes aluminum (Al).

11. The multilayer capacitor of claim 1, wherein the second layer includes a diffusion region of the element A.

12. The multilayer capacitor of claim 11, wherein the diffusion region exists at a grain boundary of a metal component included in the second layer.

13. The multilayer capacitor of claim 1, wherein the second layer includes a diffusion region of the element Z.

14. The multilayer capacitor of claim 13, wherein the diffusion region exists at a grain boundary of a metal component included in the second layer.

15. The multilayer capacitor of claim 1, wherein the second layer includes a diffusion region of the element A and element Z.

16. The multilayer capacitor of claim 15, wherein the diffusion region exists at a grain boundary of a metal component included in the second layer.

17. The multilayer capacitor of claim 1, further comprising a dummy electrode disposed in the body, and disposed at at least one of uppermost and lowermost portions of the plurality of internal electrodes.

18. The multilayer capacitor of claim 1, wherein a length of one side has a value between −10% and +10% of (250+n*350) μm based on a direction in which the plurality of internal electrodes are stacked on each other, and "n" is a natural number.

19. The multilayer capacitor of claim 1, wherein the multilayer capacitor has a thickness of 70 μm or less when the thickness is defined based on its length measured in a direction in which the plurality of internal electrodes are stacked on each other.

* * * * *